(12) United States Patent
Metz et al.

(10) Patent No.: US 11,260,834 B2
(45) Date of Patent: *Mar. 1, 2022

(54) CONVEX WHEEL CHOCK AND METHOD OF EXTRACTION

(71) Applicant: DL Manufacturing Inc., North Syracuse, NY (US)

(72) Inventors: Donald L. Metz, Kirkville, NY (US); Kristian P. Garrow, Cortland, NY (US); Kyle J. Berean, Chittenango, NY (US)

(73) Assignee: DL Manufacturing, Inc., North Syracuse, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/247,542

(22) Filed: Jan. 14, 2019

(65) Prior Publication Data

US 2019/0152449 A1 May 23, 2019

Related U.S. Application Data

(63) Continuation of application No. 14/793,668, filed on Jul. 7, 2015, now Pat. No. 10,179,572.

(51) Int. Cl.
  *B60T 3/00* (2006.01)
  *B60P 3/077* (2006.01)
  *B64F 1/16* (2006.01)

(52) U.S. Cl.
  CPC ............... *B60T 3/00* (2013.01); *B60P 3/077* (2013.01); *B64F 1/16* (2013.01)

(58) Field of Classification Search
  CPC ... B60T 3/00; B64F 1/16; B60P 3/077; B65G 69/005; B61H 7/02
  USPC .......................................................... 188/36
  See application file for complete search history.

(56) References Cited

U.S. PATENT DOCUMENTS

| | | | | | |
|---|---|---|---|---|---|
| 772,536 | A | * | 10/1904 | Rynerson ................. | B61H 7/02 188/36 |
| 1,915,320 | A | * | 6/1933 | Jones ...................... | A47B 91/12 248/188.2 |
| 2,720,285 | A | * | 10/1955 | Taylor ...................... | B60T 3/00 188/32 |
| 3,011,596 | A | * | 12/1961 | Eastman ................... | B60T 3/00 188/32 |
| 3,655,014 | A | * | 4/1972 | Nyborg ..................... | B60T 3/00 188/32 |
| 3,700,077 | A | * | 10/1972 | Harder ...................... | B60T 3/00 188/32 |
| 3,845,844 | A | * | 11/1974 | Woerner ................... | B60T 3/00 188/2 R |
| 3,993,167 | A | * | 11/1976 | Reed ........................ | B60T 3/00 188/32 |

(Continued)

*Primary Examiner* — Xuan Lan Nguyen
(74) *Attorney, Agent, or Firm* — Barry F. Manna (57) ABSTRACT

A convex wheel chock includes a contact surface generally facing a vehicle tire, a support element connected to the contact surface to transfer a tire load from the contact surface, and a base portion coupled to the support element to provide structural support to the wheel chock and transfer the tire load to a ground surface. The contact surface includes a convex surface to be engaged by the tire, extending generally upwards from the base portion to the support element, and a concave extension surface joined to an upper end of the convex surface.

8 Claims, 11 Drawing Sheets

(56) References Cited

U.S. PATENT DOCUMENTS

| | | | | |
|---|---|---|---|---|
| 4,911,270 A * | 3/1990 | Hudson | ............ | B60T 3/00 188/32 |
| 5,266,378 A * | 11/1993 | Stephenson | ............ | B60T 3/00 188/32 |
| 5,427,209 A * | 6/1995 | Tannehill | ............ | B60T 3/00 188/32 |
| 6,336,527 B1 * | 1/2002 | Metz | ............ | B60T 3/00 188/32 |
| 6,390,245 B1 * | 5/2002 | Metz | ............ | B60T 3/00 188/32 |
| D550,922 S * | 9/2007 | Bain | ............ | D34/32 |
| 8,286,757 B2 * | 10/2012 | Nelson | ............ | B60T 3/00 188/36 |
| 8,307,956 B2 * | 11/2012 | Andersen | ............ | B60T 3/00 188/36 |
| 2003/0159892 A1 * | 8/2003 | Jette | ............ | B65G 69/005 188/32 |
| 2008/0230329 A1 * | 9/2008 | Slager | ............ | B60T 3/00 188/32 |
| 2011/0100765 A1 * | 5/2011 | Bird | ............ | B60T 3/00 188/32 |
| 2011/0147151 A1 * | 6/2011 | Saubade | ............ | B60T 3/00 188/4 R |
| 2011/0226565 A1 * | 9/2011 | Jette | ............ | B60T 3/00 188/32 |
| 2011/0290596 A1 * | 12/2011 | Perkins | ............ | B65G 69/005 188/32 |
| 2012/0014763 A1 * | 1/2012 | Glickman | ............ | B60P 3/077 410/30 |
| 2013/0280003 A1 * | 10/2013 | Wessel | ............ | B60P 3/077 410/30 |
| 2014/0151161 A1 * | 6/2014 | Cheng | ............ | B60T 3/00 188/32 |

\* cited by examiner

CONVEX WHEEL CHOCK AND METHOD OF EXTRACTION

CROSS REFERENCE TO RELATED APPLICATION

This is a continuation of the invention described in U.S. patent application Ser. No. 14/793,668, filed Jul. 7, 2015 by the same inventors herein, titled "CONVEX WHEEL CHOCK AND CHOCK EXTRACTOR." The invention described in U.S. patent application Ser. No. 14/793,668 is assigned to the assignee hereof.

FIELD OF THE INVENTION

This disclosure relates generally to a wheel chock for use in restraining the movement of stationary vehicles such as trailers, trucks and aircraft and, more specifically, to a wheel chock having a convex wheel engagement surface to better distribute loading forces on the chock.

BACKGROUND OF THE INVENTION

Stationary vehicles such as cargo trucks, trailers, and airplanes are required to be restrained from movement during loading and unloading by means of chocks placed under the wheels. Chocking of the wheels prevents movement of the vehicle during loading and unloading, brake failure, or inclined parking. The wheel engagement surface of a chock is typically a flat incline or concave shape to generally match the radius of the wheel.

One noted problem with such chocks is that, even though the wheel may be properly chocked, dynamic forces during loading or unloading, for example, may push the chock horizontally along the ground. This action can be extremely dangerous, since the vehicle is momentarily not secured from movement, potentially causing a serious accident, bodily injury, or even death.

Another common problem with wheel chocks, particularly during loading operations with trucks, trailers, or aircraft, is that the additional vehicle gross weight may cause the chock to become wedged in place and not removable by hand.

SUMMARY OF THE INVENTION

In accordance with one aspect of the disclosure, a convex wheel chock for a vehicle tire includes a contact surface generally facing towards the vehicle tire to be engaged by the wheel chock, a support element connected to the contact surface to transfer a tire load from the contact surface, and a base portion coupled to the support element to provide structural support to the wheel chock and transfer the tire load to a ground surface. The contact surface includes a convex surface to be engaged by the tire, extending generally upwards from the base portion to the support element, and a concave extension surface joined to an upper end of the convex surface.

In one embodiment, the convex surface comprises a radius of curvature between 11.0 inches and 14.0 inches.

In another embodiment, the upper end of the convex surface is positioned at an angle $\alpha$ in a range between 20 and 30 degrees from horizontal.

In another embodiment, the concave extension surface comprises a radius of curvature between 2.0 inches and 3.0 inches.

In yet another embodiment, the convex wheel chock further comprises a sensor configured to detect the presence of the tire.

BRIEF DESCRIPTION OF THE DRAWINGS

The features described herein can be better understood with reference to the drawings described below. The drawings are not necessarily to scale, emphasis instead generally being placed upon illustrating the principles of the invention. In the drawings, like reference numbers refer to like elements throughout.

DETAILED DESCRIPTION OF THE INVENTION

Figure 1:
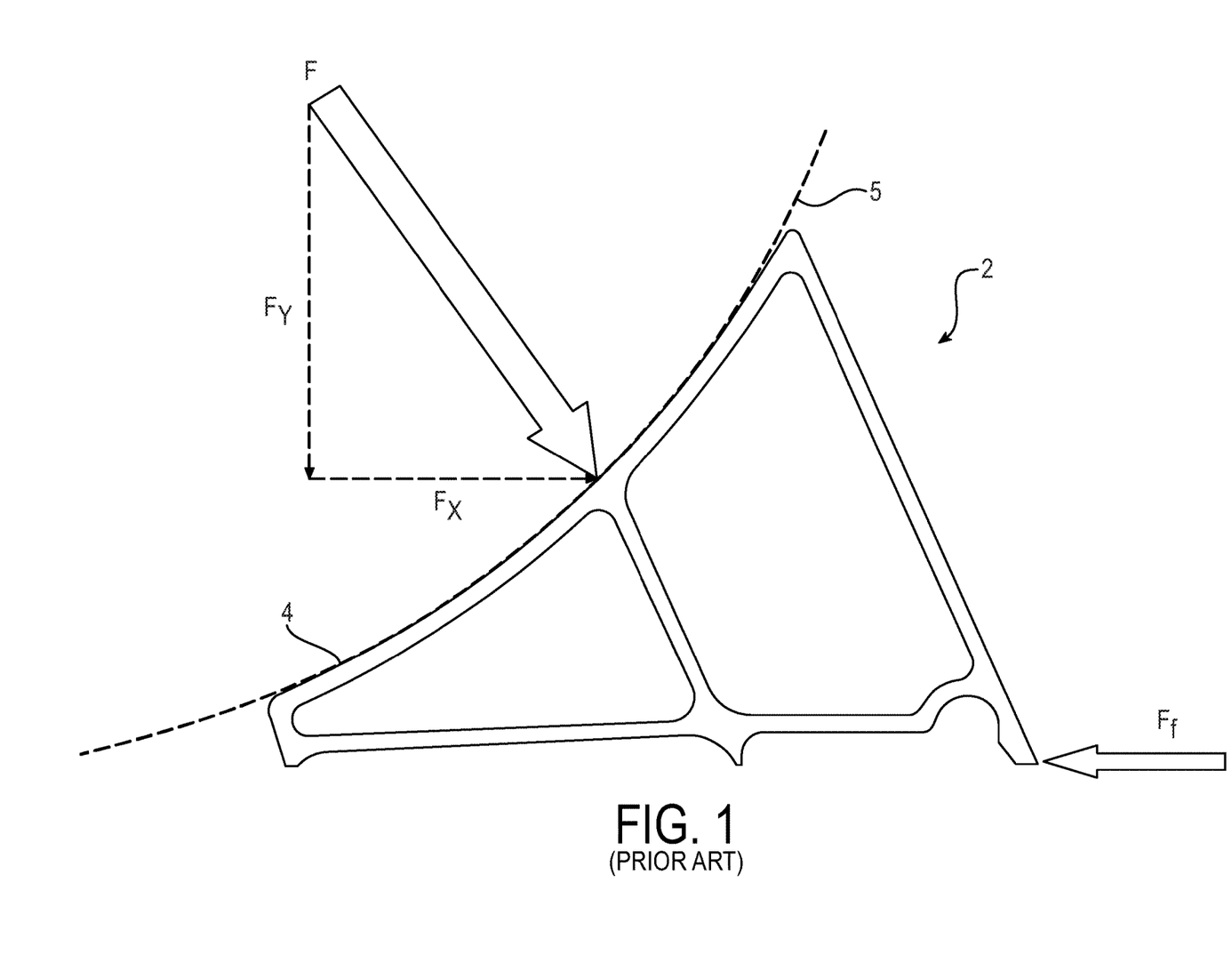
FIG. 1 depicts a side cross sectional view of a prior art wheel chock.

FIG. 1 depicts a prior art wheel chock 2 having a concave bearing surface 4 that generally matches the radius of a wheel 5, such as a trailer tire or aircraft tire (shown in dashed line). When the vehicle is secured, the resultant static load on the wheel chock 2 exerted by the vehicle is normal or perpendicular to the bearing surface 4, represented by arrow F. The resultant force F may be broken into vertical and horizontal components $F_y$ and $F_x$, respectively.

Having studied in detail the problem associated with movement of the prior art wheel chock 2 during loading or unloading operations, the inventors of the present invention concluded that, particularly with prior art concave wheel chocks, the redistribution of dynamic loads adversely altered the resultant force on the chock. In particular, the vertical component $F_y$ of the resultant force decreased, and the horizontal component $F_x$ increased to a magnitude sufficient to overcome the horizontal friction force $F_f$ keeping the wheel chock 2 in place. In the case of a truck trailer being loaded or unloaded, dynamic forces may arise from, for example, a forklift entering and exiting the trailer, or the lifting and dropping pallets or other cargo. The dynamic forces may push the wheel 5 horizontally against the chock 2, causing the wheel to "ride up" the concave surface of the chock. As the wheel rides up, the direction and magnitude of the resultant force F shifts. Due to the geometry of the concave surface, the shift results in a greater horizontal component $F_x$ of the resultant force and a decrease in the vertical component $F_y$. At a threshold point, the balance of horizontal forces $F_x$ overcomes the frictional resistance $F_f$ and the chock slides away from the wheel 5 or, in a more dangerous situation, tips over in a clockwise direction.

Embodiments of the invention disclosed herein reverse this tendency. That is, as the wheel rides up the chock due to dynamic forces, the vertical component of the resultant force increases and the horizontal component decreases. As a result, a greater downward force is imparted to the wheel chock, thereby anchoring it in position.

Figure 2:
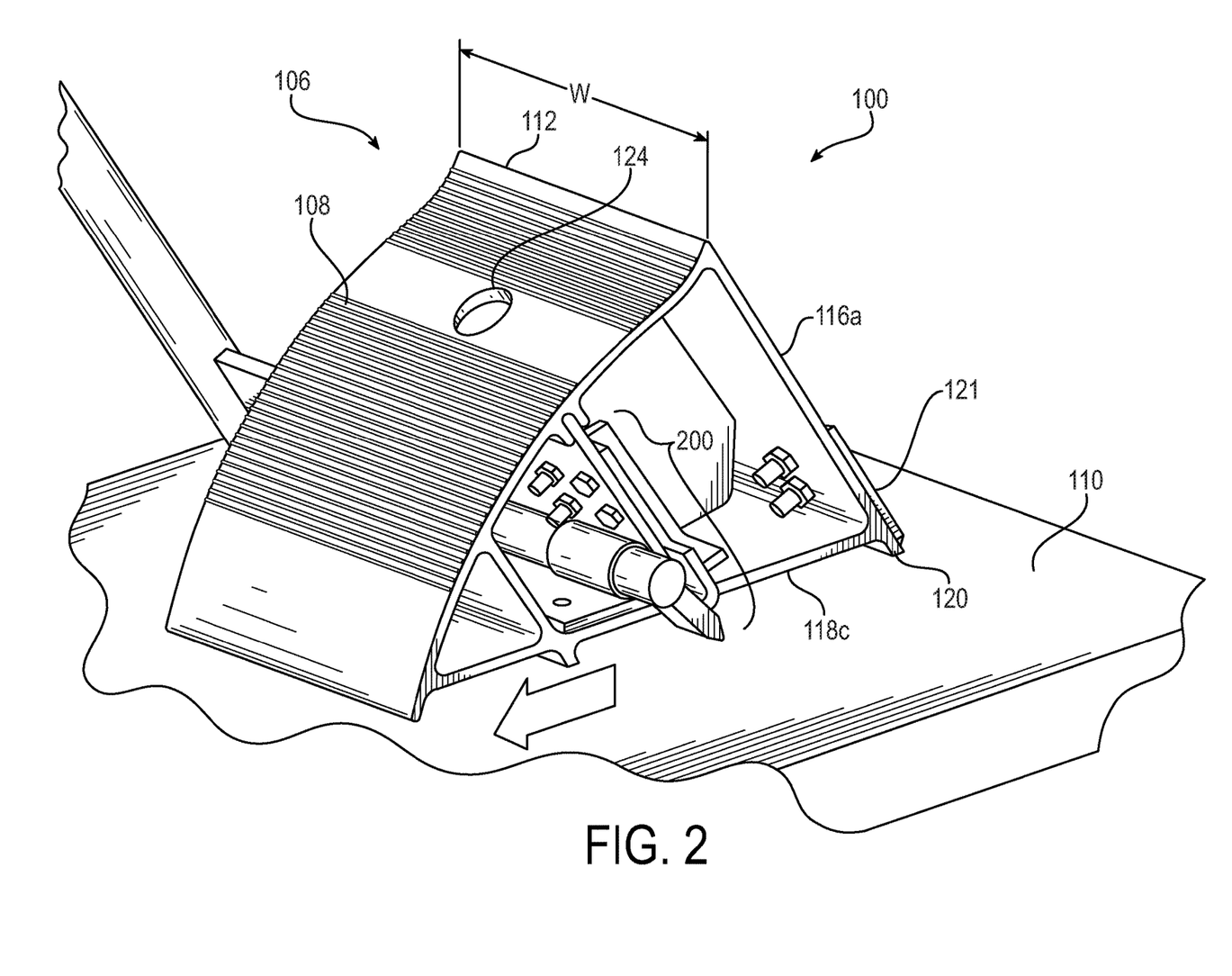
FIG. 2 depicts a perspective view of a wheel chock and chock extractor according to one embodiment of the invention.
Figure 3:
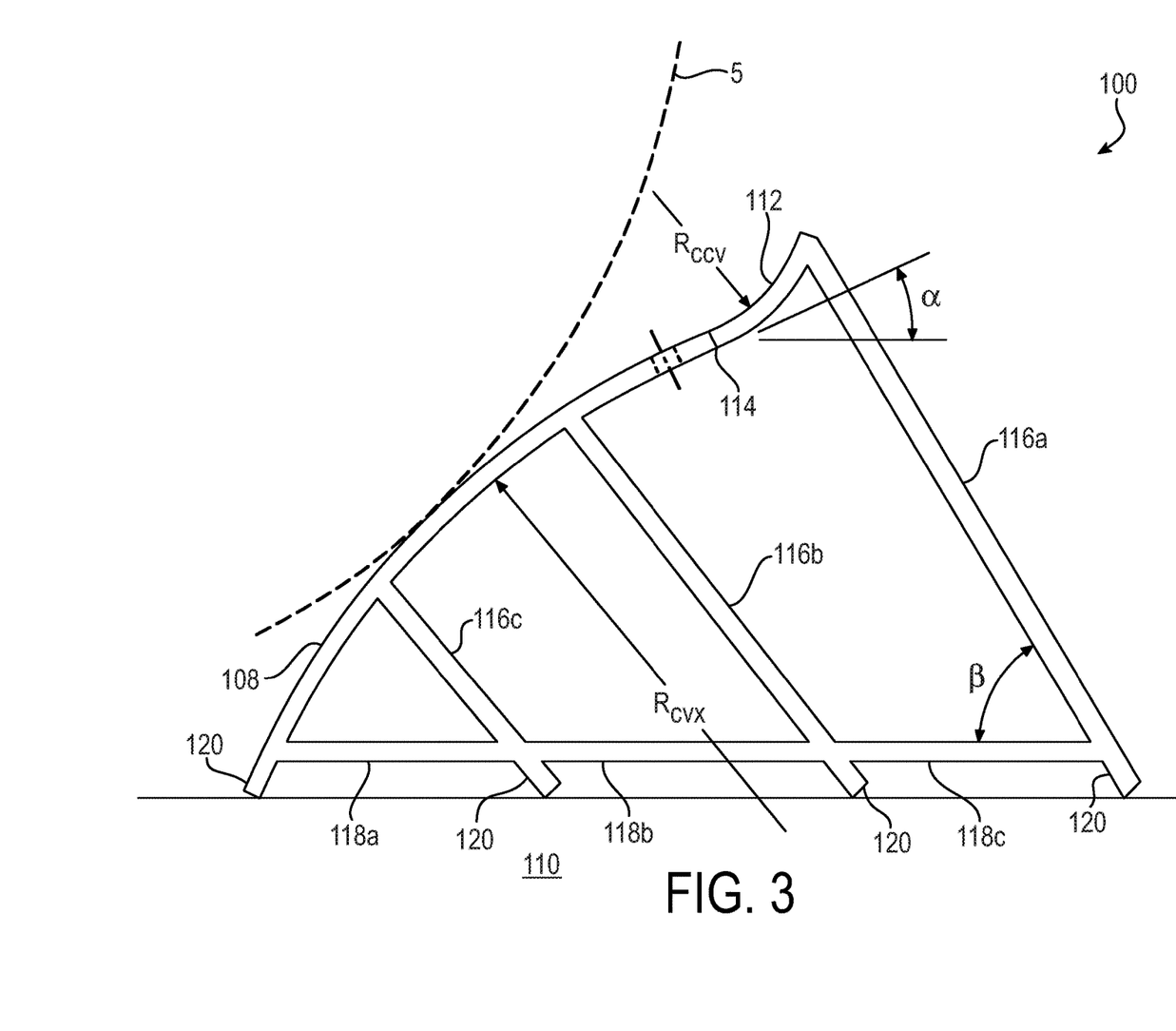
FIG. 3 depicts a side plan view of the wheel chock shown in FIG. 2.

FIG. 2 illustrates one possible embodiment of a convex wheel chock 100 and a wheel chock extractor 200, and FIG. 3 shows the convex wheel chock 100 in greater detail. The wheel chock 100 is placed in the direction indicated by the arrow in FIG. 2, on the forward side of a rear wheel to prevent the truck from moving forward.

The wheel chock 100 includes a contact surface 106 facing the wheel 5. The contact surface 106 includes a convex surface 108 having radius $R_{CVX}$ extending generally upwards from the ground surface 110. The wheel 5 engages convex surface 108 rather than a concave surface as found in the prior art. In one example, the radius of curvature $R_{CVX}$ of the convex surface 108 may be between 11.0 inches and 14.0 inches, preferably 12.25 inches. In the illustrated embodiment, the contact surface 106 further includes a concave extension surface 112 joined to an upper end 114 of the convex surface 108. The concave extension surface 112 acts as a barrier to prevent a vehicle from accidently driving over the wheel chock 100 without the chock having been removed. In one example, the radius of curvature $R_{CCV}$ for the concave extension surface 112 may be between 2.0 inches and 3.0 inches, preferably 2.43 inches. In one example, the upper end 114 of the convex surface 108 may be positioned at an angle $\alpha$ in a range between 20 and 30 degrees from horizontal. The contact surface 106 may be fabricated from ¼-inch aluminum plate having a width W of 8.0 inches. In other embodiments of the invention, the contact surface 106 does not include the concave extension surface 112.

The wheel chock 100 further includes at least one support element 116 for transferring tire loading from the contact surface 106 to the ground surface 110. In the disclosed embodiment, the support element includes three web support plates 116a, 116b, 116c welded to the contact surface 106. Each web support plate 116 may be formed from ¼ inch aluminum having a width approximately equal to the contact surface 106.

The wheel chock 100 further includes a ground engaging base portion 118 coupled to the support element 116. The base portion 118 provides structural support to the wheel chock 100 and transfers the loads to the ground. In one embodiment, the base portion 118 may be formed from a single flat plate that contacts the ground. In other embodiments, the base portion 118 may include two or more plate sections welded or otherwise joined to the web support plates. In the disclosed embodiment, the base portion 118 comprises a front section base plate 118a, a mid-section base plate 118b, and a rear section base plate 118c. Each base plate may be formed from ¼ inch aluminum having a width approximately equal to the contact surface 106 (e.g., 8 inches). The front section base plate 118a may be welded at one end to the contact surface 106 and at the other end to the web support plate 116c. The mid-section base plate 118b may be welded at one end to the web support plate 116c and at the other end to the web support plate 116b. The rear section base plate 118c may be welded at one end to the web support plate 116b and at the other end to the web support plate 116a.

In one embodiment of the invention, the base portion 118 includes at least one projection 120 to concentrate the load path to the ground surface 110. In doing so, the projection(s) 120 push into the ground and greatly increase the horizontal resistance to movement. In the illustrated example, the projections 120 are provided by the edges of the contact surface 106 and the web support plates 116a, 116b, 116c. The projections 120 may be disposed at angles relative to horizontal that further increase the horizontal resistance to movement. For example, web support plates 116a, 116b, 116c may be at an angle $\beta$ between 45 degrees and 60 degrees. In one embodiment, the projection 120 opposite the wheel point of contact may be reinforced by a back leg wear plate 121 (FIG. 2).

Figure 4:
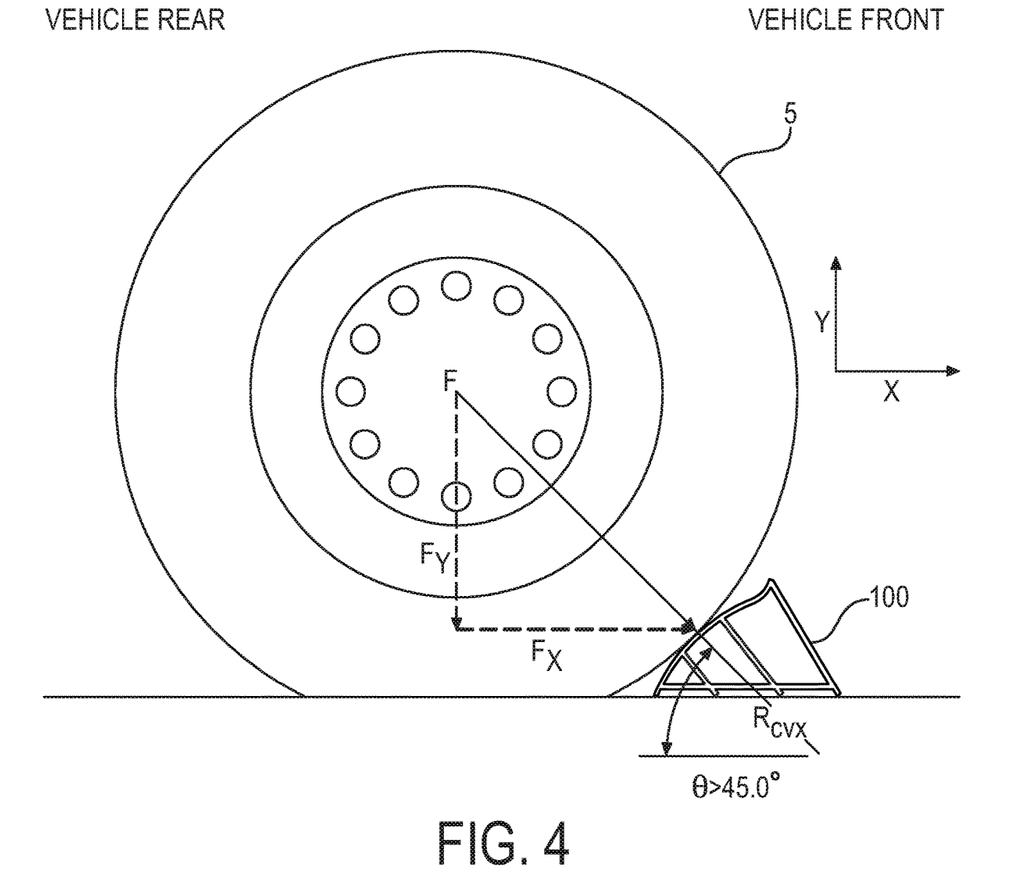
FIG. 4 depicts an alternate side plan view of the wheel chock shown in FIG. 2.

FIG. 4 illustrates the governing principles of the invention in greater detail. The resultant force F exerted by the vehicle on the wheel chock 100 is shown as a vector normal to the convex surface 108, at a contact angle $\theta$. The resultant vector force F can be broken into its horizontal component $F_x$ and its vertical component $F_y$. The value of the horizontal component $F_x$ equals (F×cos $\theta$) and the value of the vertical component $F_y$ equals (F×sin $\theta$). At contact angles greater than 45°, sin $\theta$ is greater than cos $\theta$ and therefore the vertical component $F_y$ of the force F will be greater than the horizontal component $F_x$. Thus, in the event dynamic forces tend to push the vehicle into the chock 100, the wheel 5 will travel in the positive x-direction and ride up the convex surface 108 of the chock. In doing so, the new resultant force vector F normal to the convex surface 108 also moves up, which increases the contact angle $\theta$. A greater value in contact angle $\theta$ will increase the value of the vertical component $F_y$ while decreasing the value of the horizontal component $F_x$. The net effect is that, under dynamic loading, the wheel chock 100 will tend to anchor itself downwards rather than slide backwards (in the positive x-direction) or tip over.

Figure 5:
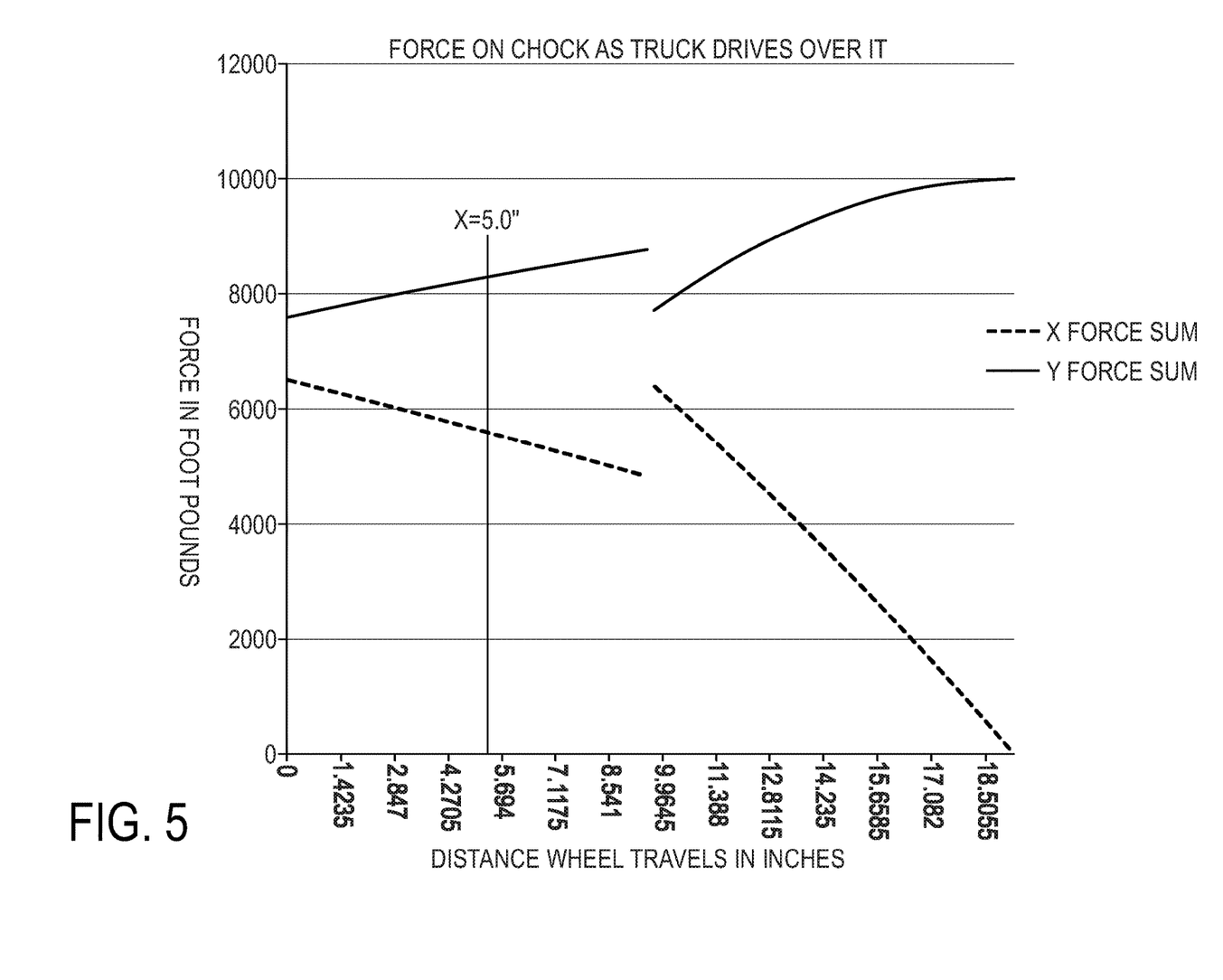
FIG. 5 graphically illustrates the forces acting on the wheel chock of FIG. 2 according to one embodiment of the invention.

This principle of operation is graphically depicted in FIG. 5, corresponding to x=0.0, an initial contact angle $\theta$=50°, and a truck mass of 10,000 pounds reacting through the four projections 120. At this initial condition, $F_y$ equals approximately 7,610 pounds and $F_x$ equals approximately 6,490 pounds. As the tire moves in the positive x-direction and rides up the convex surface 108 of the chock, the vertical component of the resultant force increases and the horizontal component decreases. For example, at x=5.0 inches, $F_y$ increases to approximately 8,310 pounds, and $F_x$ decreases to approximately 5,560 pounds.

In order to assure the tire contact angle on the chock 100 is greater than 45°, consideration should be given to the tire size to be restrained. It may be appropriate to offer different sizes or classes of wheel chock 100. For example, a passenger vehicle may have a tire diameter of approximately 26 inches, a long-haul trailer tire may have a tire diameter of 42 inches, and an aircraft tire may have a diameter of 52 inches. In order for the contact surface 106 to align properly with the wheel, differing heights of the wheel chock 100 may be useful.

Figure 6:
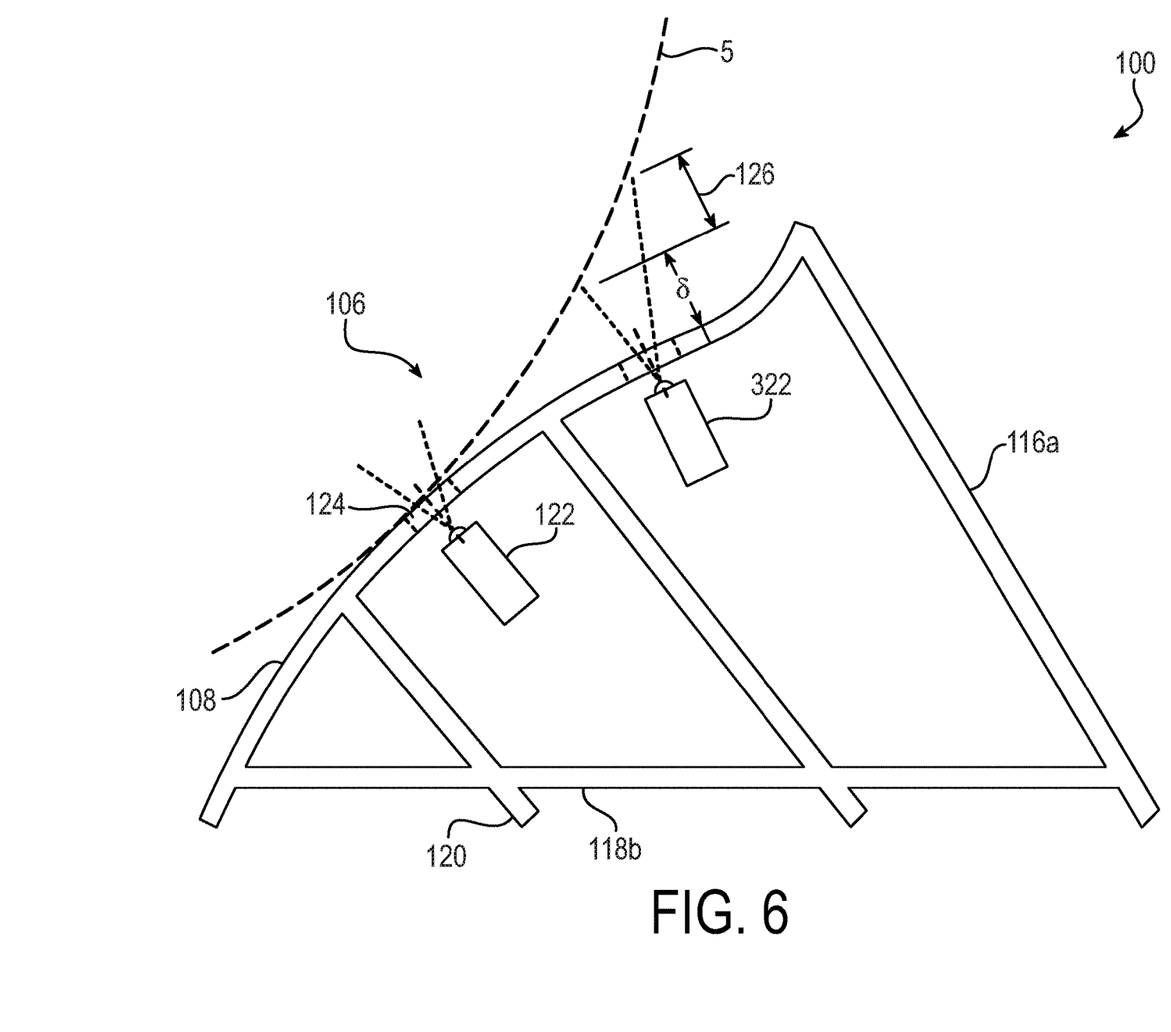
FIG. 6 depicts a side plan view of the wheel chock shown in FIG. 2 according to yet another embodiment of the invention.

Turning now to FIG. 6, in one embodiment of the invention the wheel chock 100 may further include a sensor 122 for detecting the presence of the wheel 5. The output of sensor 122 may serve as logical input for a dock light warning system to assure the presence of the wheel chock 100 against the wheel 5 when a truck is backed into position adjacent a loading dock.

In one possible implementation, the contact surface 106 defines an aperture 124, and the sensor 122 is adapted to measure the presence of the wheel 5 through the aperture 124. The aperture 124 may be disposed, for example, in the convex surface 108 of contact surface 106, as illustrated in FIG. 2. The sensor 122 may be any type of data-gathering, data-transmitting device that is suitable for the conditions. In one example, the sensor 122 may be an ultrasonic device that includes an ultrasonic transducer or transceiver adapted to generate high frequency sound waves and evaluate the echo which is received back by the sensor. By measuring the time interval between sending the signal and receiving the echo, the sensor can determine if a truck tire is present over the aperture 124. In another example, the sensor 122 may be a proximity-sensing photoelectric sensor in which an emitter is adapted to transmit a beam of light (such as pulsed infrared, visible red, or laser) that diffuses through the aperture 124. As the wheel 5 covers the aperture 124, part of the light beam deflects back to a receiver, detection occurs, and an output may be transmitted to a controller or microprocessor.

In one embodiment of the invention, a sensor 322 may detect the presence of a vehicle wheel 5 by measuring or otherwise detecting a gap distance 126 between the contact surface 106 and the wheel 5 engaged by the chock. The sensor 322 may be adapted to sense "go, no-go" zones. For example, the sensor 322 may only signal a positive wheel detection in a range between a lower limit or offset δ and the gap distance 126. By this method, a sensor signal showing a gap distance less than δ indicates the wheel is rolling up over the chock, and emergency alarms may be triggered. In one example, δ may be 1.0 inch, and the gap distance 126 may be 3.0 inches.

Prior art sensors on concave chocks sensed if the wheel was directly against the chock surface, i.e., zero gap. One problem with this approach was that an operator could bypass the safety system by placing a flat object over the aperture. The sensor would sense a zero gap and provide a false positive wheel detection. By sensing the presence of a tire within the gap distance 126, the bypass problem is alleviated.

Figure 7:
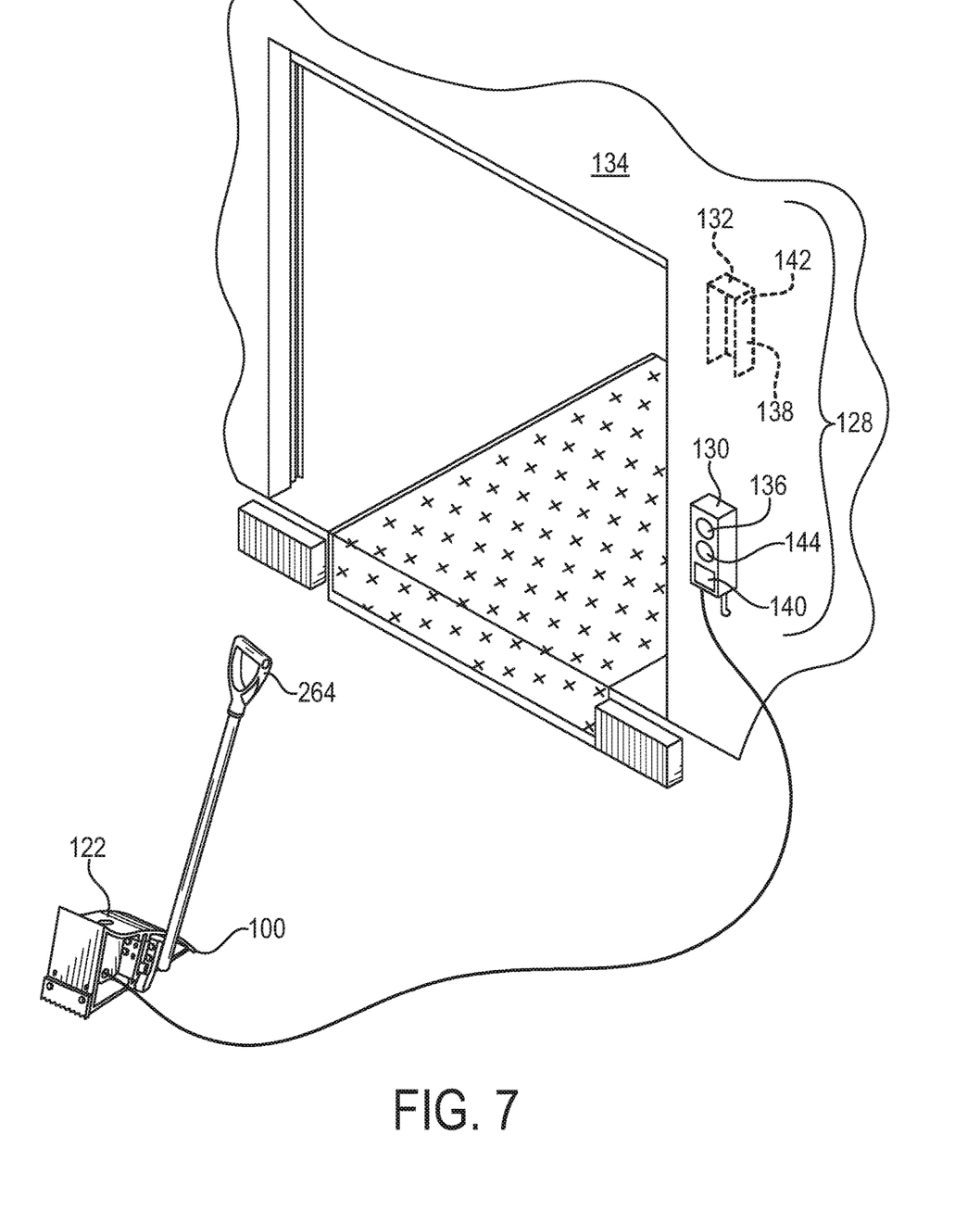
FIG. 7 depicts a perspective view of the wheel chock and chock extractor shown in FIG. 2 connected to a dock safety sensor system.

Turning now to FIG. 7, in another embodiment of the invention the sensor 122 may be operatively associated with a dock safety sensor system 128, such as the Smart Chock™ brand sensor system sold by DL Manufacturing, Syracuse, N.Y. Briefly, the dock safety sensor system 128 is a trailer restraint system that secures the trailer while communicating with drivers and loading dock workers to ensure a safe and productive work environment. The dock safety sensor system 128 includes the wheel chock 100, an outside-mounted light box 130, and an inside-mounted control panel 132 with light box (shown in dashed lines because it is located on the other side of a dock wall 134).

In operation, in a first step, as a driver backs up to a closed overhead door, the outside light box 130 illuminates green 136, indicating it is safe to proceed. Concurrently, the control panel 132 illuminates a red light 138, indicating the trailer is not chocked and it is unsafe to open the overhead door. In a second step, when the trailer is parked and chocked, the sensor 122 or 322 in the wheel chock 100 relays the condition to the inside control panel 132, which illuminates a chock indicator light 140 on the outside light box 130. Concurrently, the red light 138 turns off and a green light 142 illuminates on the inside control panel 132, indicating the trailer is chocked and it is safe to open the overhead door. In a third step, a photovoltaic sensor detects when the door is opened, relays the condition to the inside control panel 132, and a flashing red light 144 is illuminated on the outside light box 130, indicating to the truck driver that loading operations are in progress and it is unsafe to remove the chock. The green light 142 remains illuminated on the inside control panel 132. In a fourth step, when loading or unloading operations are complete and the overhead door is closed, the flashing red light 144 is turned off on the outside light box 130, indicating it is now safe to remove the chock. In a fifth step, after the driver removes the chock, the sensor 122 or 322 in the chock relays the condition to the inside control panel 132, which turns off the chock indicator light 140 on the outside light box 130. Concurrently, the green light 142 turns off and the red light 138 illuminates on the inside control panel 132, indicating the trailer is no longer chocked and it may be unsafe to open the overhead door.

As noted above, one problem with some types of wheel chock is that the additional vehicle gross weight may cause the chock to become wedged in place and not removable by hand. For example, truck drivers may resort to using a heavy steel breaker bar to dislodge or free a chock from a newly loaded long-haul trailer. Hammering or prying the chock with a steel tool to dislodge it may damage an expensive vehicle or aircraft tire. In another example, wood chocks used for aircraft tires have become so firmly lodged following refueling that aircraft support crews have been known to break the chock free with a sledge hammer, sometimes needing to break apart.

It was realized that a chock extractor apparatus can be built into a chock. The chock extractor can take advantage of the leverage provided by a chock extractor handle, yet safely couple the lever action to one or more chock extractor feet operatively coupled between the chock and the ground surface. While non-destructively pushing the chock into the tire, the level bar or extractor foot do not put undue or destructive puncturing point forces on a surface of the wheel.

Figure 8:
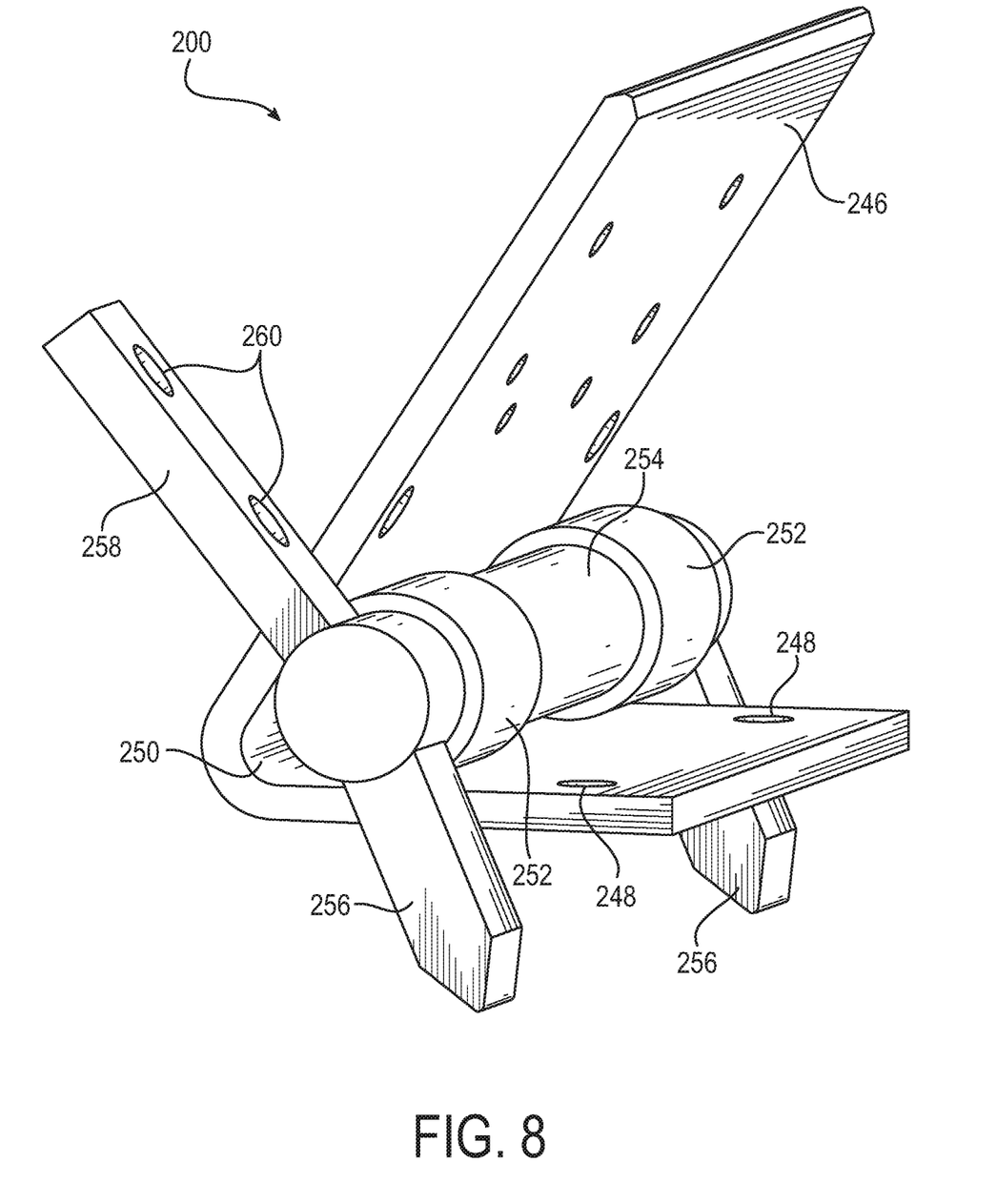
FIG. 8 depicts a perspective view of one exemplary embodiment of a chock extractor.

In another embodiment of the invention a wheel chock extractor 200 may be operatively associated with the wheel chock 100. FIG. 2 depicts one embodiment of a wheel chock extractor 200 integrated with the wheel chock 100, and FIG. 8 depicts the chock extractor 200 as a stand-alone device. Referring to FIG. 8, the wheel chock extractor 200 may include a mounting bracket 246 to secure the extractor assembly to the wheel chock 100. The bracket 246 may include mounting holes 248 to mechanically couple chock extractor 100 to, or more typically within, a chock.

The mounting bracket 246 may be bent to form an acute angle, the bend having a sufficiently generous radius such that an internal pocket 250 is formed. At least one extractor sleeve 252 may be mechanically coupled to the mounting bracket 246 at about the bend pocket 250. In the illustrated embodiment, two extractor sleeves 252 are disposed at opposing sides of the bracket. The extractor sleeve 252 may serve as a bearing surface and guide for a rotatable shaft 254 disposed within.

The wheel chock extractor 200 may further include an extractor foot 256 mechanically coupled to an end of the shaft 254. In the illustrated embodiment, two extractor feet 256 are disposed on either side of the mounting bracket 246. However, a single foot has been shown to perform satisfactorily. Those skilled in the art will appreciate that the extractor foot 256 may comprise many different suitable shapes. For example, an extractor foot could have an arc shape, a circular shape, a wheel shape, a wheel with teeth (e.g., similar to a gear or cam shape), or any other shape suitable to engage the ground surface to dislodge a chock.

An actuator 258 may be mechanically coupled to the shaft 254. The actuator 258 can provide mechanical advantage to the force required to rotate the shaft 254, and alleviate the need for an operator to stoop or bend over when removing the chock. In one embodiment, the actuator is an elongated bar. The bar 258 may be offset from vertical or canted at an angle of about 2 degrees to 45 degrees to provide further mechanical advantage. The actuator 258 may define holes 260 to secure an additional length of bar to the actuator 258.

Figure 9:
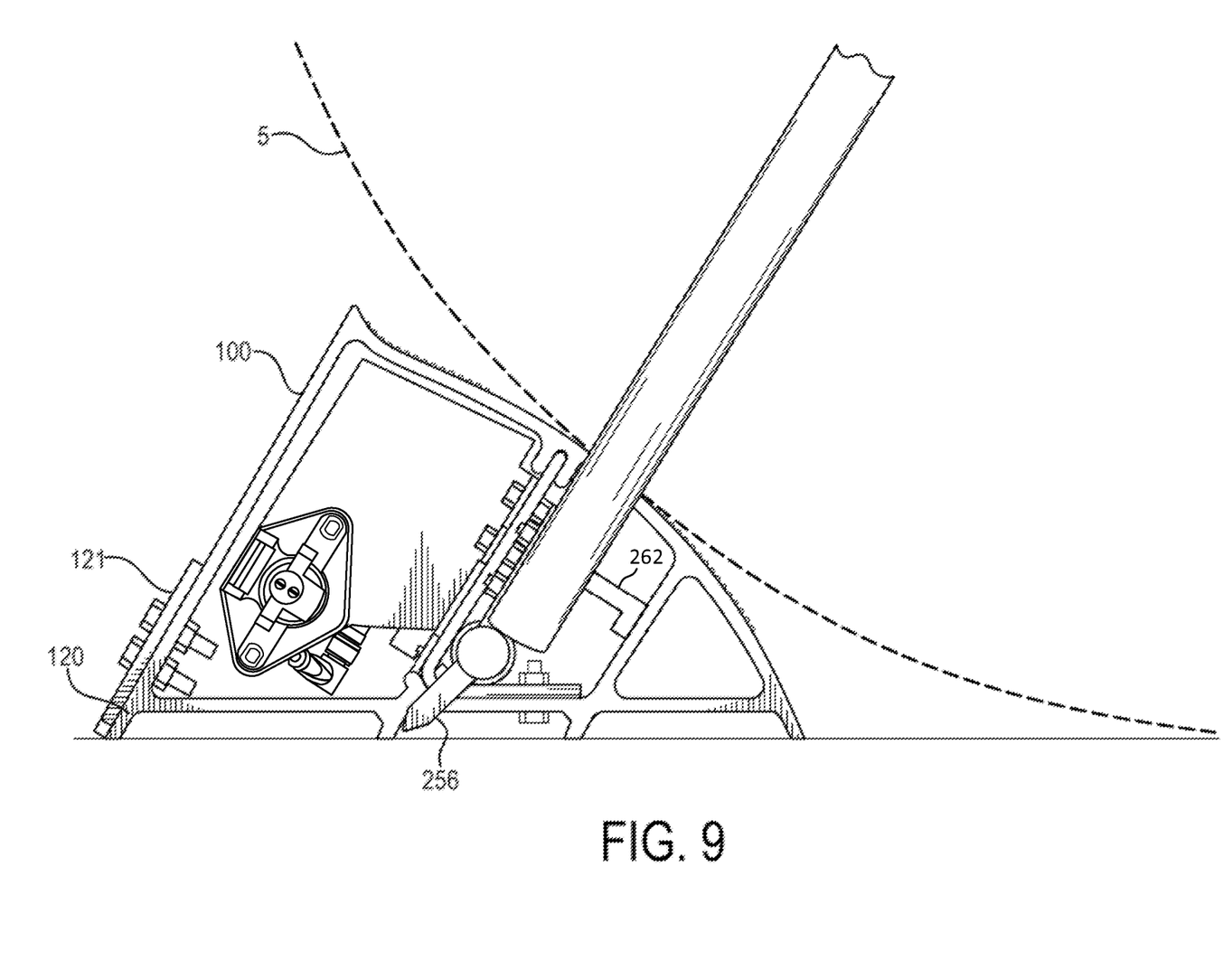
FIG. 9 depicts a side view of a chock with the chock extractor of FIG. 8 holding a vehicle tire from moving.
Figure 10:
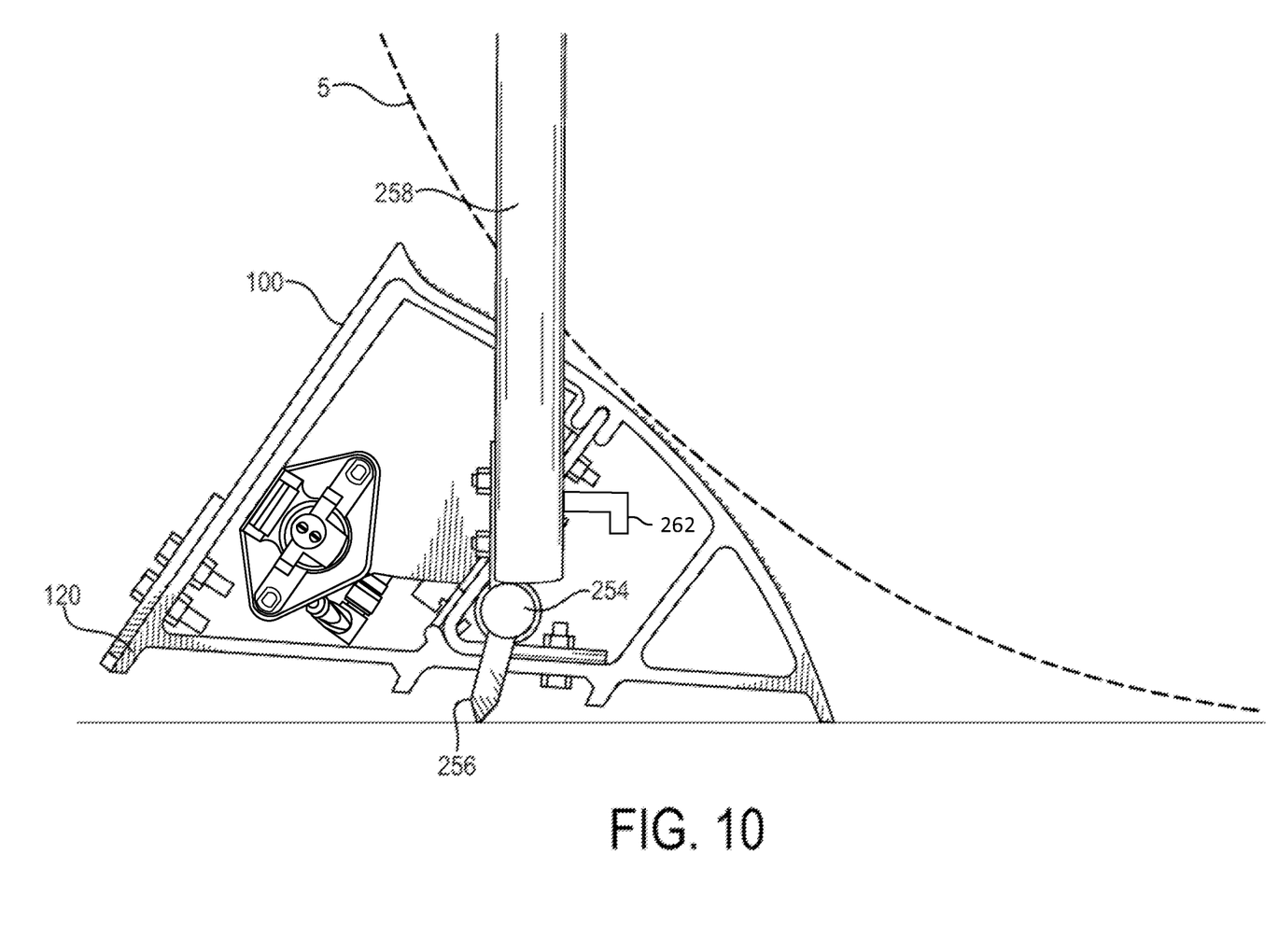
FIG. 10 depicts a side view of a chock with the chock extractor of FIG. 9 extracting the chock from under the tire by rotating the extractor handle.
Figure 11:
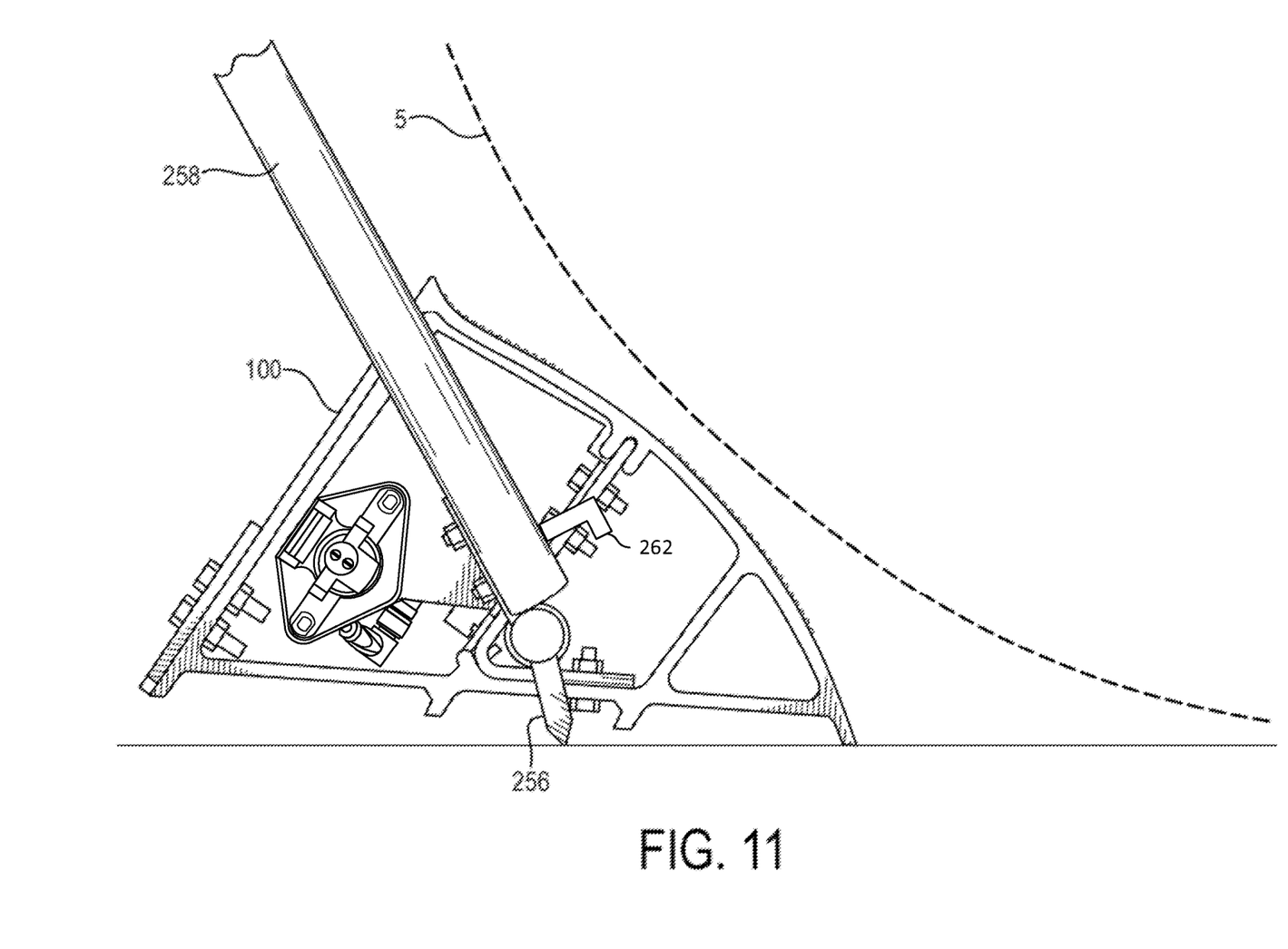
FIG. 11 depicts a side view of a chock with the chock extractor of FIG. 9 where following operation of the chock extractor, the chock has been dislodged from under the tire.

Turning to FIG. 9, FIG. 10, and FIG. 11, a method of use of the exemplary chock extractor 200 of FIG. 2 is now described. FIG. 9 shows a chock having installed within a chock extractor according to the application. A vehicle tire wheel 5 is represented as chocked against an exemplary convex wheel chock 100. The chock is holding the vehicle tire from moving forward (e.g., to the left in FIG. 9) by transferring any moving force of the vehicle to the projections 120 of the chock. Note that the forward-most projection 120 is shown as reinforced by back leg wear plate 121. The extractor foot 256 is shown off the ground. In this chocked mode, the extractor foot 256 could also be resting on the ground, without applying any significant translational or torsional force to the ground surface. In the exemplary embodiment of FIG. 9, there is also an L-shaped internal cam element 262 which allows the actuator 258 to remain in a somewhat upright position by resting on an internal surface of the chock. The somewhat upright position of the actuator 258 holds the handle and an optional hand hold 264 (FIG. 7) at convenient grabbing height for the truck driver or chock operator to reach for.

Turning now to FIG. 10, an operator has grabbed the actuator bar 258 and rotated the handle causing the rotating shaft 254 and the extractor feet 256, which are mechanically coupled to the shaft, to also rotate. As the extractor feet 256 bite into the ground surface (e.g., asphalt or concrete), the chock 100 is pushed non-destructively into the vehicle tire 5. With just a slight indentation made in the vehicle tire, the forward-most projection 120 of the chock 100 comes free of the ground surface and rotates up and away from the ground. Because any dynamic force of the vehicle tire was vectored from the tire contact with the chock to predominantly the forward-most projection 120, and with that projection 120 no longer in good contact with the ground surface, the chock 100 can be removed from beneath the tire.

One benefit of a chock extractor 200 as described hereinabove is that, especially with the lever action of the actuator handle 258 (e.g., the ratio of the length of the handle to the length of the extractor feet 256) a chock can almost always be removed despite a vehicle tire having been wedged more tightly against the chock by a load that has been added to the vehicle after having been initially chocked when the vehicle was un-loaded. Such loading scenarios are often problematic where conventional chocks become immovable when installed prior to the loading or re-fueling of any tired vehicle including, for example, trucks, trailers, and aircraft.

FIG. 11 shows the dislodged chock 100 of FIG. 10 moving farther away from the initial chocked position as the actuator handle 258 is rotated further causing the extractor feet 256 to walk the chock out from under the vehicle tire.

Other embodiments are contemplated without departing from the scope of the invention. In one contemplated embodiment, the extraction mechanism may be power-actuated rather than by the manual method disclosed thus far. Any suitable actuator may be used to provide a rotational torque to operate the shaft. For example, the actuator 258 may be a rotational actuator, a cam actuator with a linkage, a linear actuator with a linkage, or the like. In some embodiments, the actuator may include a motor (e.g., a reversible motor) with a reduction gear box between the motor and the shaft for increased angular torque. It is contemplated that an actuator may be of a type powered by an electric power source, a hydraulic power source, or a pneumatic power source. The power source could be on the vehicle or aircraft, or supplied by a nearby fixed base or portable support power source.

Other contemplated embodiments include variations on the extractor handle. For example, in some vehicle applications the actuator 258 may be shorter to clear any nearby vehicle structure. Similarly, in some specialized applications, a handle can jut out (e.g., a bend of a small angle of approximately 10 degrees) to about a right angle from the vehicle, and then have another bend of a small angle (e.g., approximately 10 degrees) to about a right degree angle to return to a somewhat parallel direction to the actuator. In other embodiments, the actuator handle 258 may be bent so as to be closer to the ground, with a vertical motion to free the chock (e.g., manually pushing down on the handle or stepping on a handle or a lever arm). In foot operated embodiments, compared with an extractor handle designed for operation by hand, a foot operated extractor handle can have a foot pedal instead of a hand grip.

The mounting bracket 246 can be made, for example, by cutting a flat section from a sheet of any suitable material, typically a metal, by any suitable cutting means. Suitable cutting means include stamping, laser cutting, arc cutting, etc. Suitable materials include tungsten, titanium, stainless steel, steel, and aluminum. The still-flat cut plate can then be formed, typically by mechanically forming, such as, for example, by a metal break to the bent shape show hereinabove. The bend angle is not particularly important and only need be able to accept the sleeves to be affixed into the bend the in the extractor mounting plate. There can optionally be some additional filing, grinding, and/or sanding to finish some or all edges.

The extractor sleeve 252 can be made from metal tube stock by cutting off one or more sections of tube. Any suitable metal cutting means can be used to cut the tube stock. There can optionally be some additional filing, grinding, and/or sanding to finish some or all edges. The extractor sleeves 252 are typically welded to the extractor mounting bracket 246. While the exemplary chock extractor described hereinabove uses two extractor sleeves, those skilled in the art will appreciate that a chock extractor could have one continuous sleeve or more than two sleeves and still perform the same chock extraction function in substantially the same way.

The extractor shaft 254 can be cut from any suitable metal rod stock by any suitable cutting means.

The actuator 258 and extractor foot (or feet) 256 can typically be made from any suitable bar stock, typically a metal bar stock. The actuator 258 and extractor feet 256 can be cut from the metal stock using any cutting means suitable to cut metal parts from a metal bar stock. The actuator 258 and extractor feet 256 are typically welded to the extractor shaft 254. There could also be a keyway assembly method where either or both of the actuator 258 and extractor feet 256 have a protrusion which fits in a way in the extractor shaft 254 by press fit or with additional welding. In some applications (e.g., a high-end military application), either or both of the actuator 258 and extractor feet 256 could have a threaded shaft which screws into a corresponding threaded hole in the extractor shaft 254. There can also be any other suitable sliding engagement mechanisms (e.g., transverse spring ball and cup) or techniques with or without a locking feature to allow for either or both of the actuator and the extractor feet to be field removable or replaceable. The points on the end of each extractor foot can be provided by grinding, milling, or any other suitable cutting means. While generally not needed, extractor feet could have a reinforcing plate on one or both sides, or a hardened tip provided by any suitable metal working technique (e.g., annealing) or a hardened tip of another metal affixed by any suitable means to another metal which forms the bulk of the extractor foot and couples (e.g., by welding) to the extractor shaft.

The extractor handle 264 can be made from any suitable material strong enough to survive the modest rotational force of, for example, a truck driver or vehicle crew member pulling or pushing the handle rotate the extractor shaft following the lever action of the extractor handle. Wood, fiberglass, or aluminum (solid or tube stock) are exemplary suitable materials for making the extractor handle which can simply be cut to the desired length and fixed by any suitable means to the actuator 258. Typically a handle 264 can be bolted to the actuator bar 258 by two suitably spaced apart bolts and nuts with optional washers and/or lock washers. In some very high-end (typically less cost sensitive applications), the handle 264 can have a solid threaded end part that can screw into a suitable mating threaded hole in a relatively thick actuator bar (e.g., thick enough to support a suitable threaded hole). The extractor handle 264 could also be made removable by using any suitable mechanical connector, part of the connector mechanically coupled to the actuator, the other part to a removable handle. In this manner, using a handle mechanical connector would allow the handle 264 to be removed for a more compact storage of a chock with a chock extractor installed therein.

Where parts are welded together (e.g., sleeves to extractor mounting plate, or actuator and extractor feet to extractor shaft) any suitable welding method can be used, such as, for example, stick and rod welding, metal inert gas (MIG) welding, tungsten inert gas (TIG) welding, etc.

Most of the extractor parts described hereinabove are typically made from a metal stock. Except for ultra-high reliability applications, such as for example chocking military aircraft, most applications will use steel as offering a nearly ideal cost-strength relationship. For example, 1010 carbon steel alloy is thought to be suitable for many commercial trucking applications (e.g., for typical 18 wheeled trucks). Metals which can corrode in an outdoor vehicle and truck environment can be treated so as to be corrosion resistant. For example, metals can be zinc plated, painted, or galvanized. While more exotic for such applications, galvannealed coatings can also be used. Generally aluminum, while more weather and corrosion resistant would use a higher grade aircraft alloy and be of sufficient thickness for the application which might add cost beyond typical commercial applications. However, where cost is less of an issue, aluminum might be particularly attractive for lower weight and appearance, such as, for example in military tactical operations or in high end race car applications.

The extractor handle can be colored (e.g., by painting) a bright yellow or orange color for visibility to be especially noticeable by a vehicle operator.

As noted above, the disclosed wheel chock extractor 200 can be mechanically mounted within a convex wheel chock 100, but this embodiment is exemplary in nature and not meant to be limiting. The wheel chock extractor 200 may be suitable for any type of chock. The shape of the chock, such as for example, rectangular, triangular, trapezoidal, concave, or convex is unimportant to the chock extractor installation or operation. The extractor mounting bracket 246 can be slidingly engaged into one or more slots in the chock, and/or bolted into a chock, and/or welded into a chock. There might also be embodiments were the extractor mounting bracket is affixed to a chock by any suitable glue, adhesive, and/or epoxy.

While the present invention has been described with reference to a number of specific embodiments, it will be understood that the true spirit and scope of the invention should be determined only with respect to claims that can be supported by the present specification. Further, while in numerous cases herein wherein systems and apparatuses and methods are described as having a certain number of elements it will be understood that such systems, apparatuses and methods can be practiced with fewer than the mentioned certain number of elements. Also, while a number of particular embodiments have been described, it will be understood that features and aspects that have been described with reference to each particular embodiment can be used with each remaining particularly described embodiment.

A sample of methods that are described herein are as follows:

A method for removing a wheel chock from underneath a tire, comprising the steps of:

providing a chock extractor 200 comprising a mounting bracket 246 secured to the wheel chock, an extractor sleeve 252 coupled to the mounting bracket, a shaft 254 rotatingly disposed within the extractor sleeve, an extractor foot 256 coupled to the shaft and configured to engage a ground surface 110, and an actuator 258 coupled to the shaft;

rotating the actuator 258 such that the shaft 154 rotates and the coupled extractor foot 256 rotates into the ground surface 110, thereby forcing the wheel chock into the tire; and releasing one or more projections 120 of the wheel chock from the ground surface 110 to disengage the wheel chock from underneath the tire.

The method of paragraph [0065], wherein the wheel chock 100 is a convex wheel chock, and the step of releasing one or more projections 120 comprises releasing the forward-most projection 120 of the wheel chock 100 from the ground surface such that the wheel chock 100 rotates up and away from the ground.

A chock extractor for removing a wheel chock, the chock extractor comprising a mounting bracket, an extractor sleeve coupled to the mounting bracket, a shaft rotatingly disposed within the extractor sleeve, an extractor foot coupled to the shaft and configured to engage a ground surface, and an actuator coupled to the shaft and configured to provide mechanical advantage to rotate the shaft.

The chock extractor of paragraph [0070], further comprising a hand hold mechanically coupled to the actuator.

The chock extractor of paragraph [0070], further comprising a cam element coupled to an internal surface of the wheel chock, the cam element configured to position the actuator at rest in a predominantly upright position.

The chock extractor of paragraph [0070], wherein the mounting bracket comprises a bend to form an acute angle, the bend having a radius sufficient to form an internal pocket, and wherein the extractor sleeve is secured to the mounting bracket at the bend pocket.

The chock extractor of paragraph [0070], wherein the actuator comprises a power-actuated rotational actuator.

The invention claimed is:

1. A wheel chock for a vehicle tire comprising a contact surface configured to face towards the vehicle tire, the contact surface comprising a convex surface extending upwards from a base portion, and further comprising a concave extension surface extending upwards from an upper end of the convex surface, the convex surface comprising a radius of curvature $R_{CVX}$ that is approximately 4.5-5.5 times greater than a radius of curvature $R_{CCV}$ of the concave extension surface.

2. The wheel chock according to claim 1, wherein the convex surface comprises a radius of curvature $R_{CVX}$ between 11.0 inches and 14.0 inches, and the concave extension surface comprises a radius of curvature $R_{CCV}$ between 2.0 inches and 3.0 inches.

3. A method for removing a wheel chock from a tire, comprising the steps of:
   providing a chock extractor comprising a mounting bracket coupled to the wheel chock, a shaft rotatingly coupled to the mounting bracket, the shaft disposed within a bearing sleeve in coupled engagement with the mounting bracket, an extractor foot coupled to the shaft and configured to engage a ground surface, and an actuator coupled to the shaft;
   moving the actuator to rotate the shaft and extractor foot, thereby causing the extractor foot to bite into the ground surface and lift and push the chock against the tire; and
   moving the actuator through its full travel, thereby further pushing the chock against the tire to unload the vehicle forces from the chock and release the wheel chock from the ground surface to disengage the wheel chock from underneath the tire.

4. The method of claim 3, wherein the step of moving the actuator through its full travel comprises rotating the wheel chock up and away from the ground.

5. The method of claim 4, wherein the wheel chock further comprises at least one projection to concentrate the load path to the ground surface, and the step of moving the actuator through its full travel comprises releasing the forward-most projection of the wheel chock from the ground surface such that the wheel chock rotates up and away from the ground.

6. The method of claim 3, wherein the actuator is a handle.

7. The method of claim 3, wherein, prior to the step of moving the actuator to rotate the shaft, the actuator foot is stored in a position that is raised off the ground.

8. The method of claim 3, further comprising the step of positioning a cam element on an internal surface of the chock so as to store the actuator in an upright position.

* * * * *